Dec. 12, 1950  B. VOLGOVSKOY  2,533,645
ENCLOSED SWITCHGEAR WITH ADJUSTABLE PANEL
Filed Sept. 11, 1948  2 Sheets-Sheet 1

Inventor
Boris Volgovskoy
by F. B. Lindley
Attorney

Dec. 12, 1950     B. VOLGOVSKOY     2,533,645
ENCLOSED SWITCHGEAR WITH ADJUSTABLE PANEL

Filed Sept. 11, 1948     2 Sheets-Sheet 2

Inventor
Boris Volgovskoy

Patented Dec. 12, 1950

2,533,645

UNITED STATES PATENT OFFICE 2,533,645

ENCLOSED SWITCHGEAR WITH
ADJUSTABLE PANEL

Boris Volgovskoy, Milwaukee, Wis., assignor to
Allis-Chalmers Manufacturing Company, Milwaukee, Wis., a corporation of Delaware Application September 11, 1948, Serial No. 48,892

8 Claims. (Cl. 175—298)

This invention relates generally to improvements in metal enclosed switchgear of the drawout type and more particularly to the structure of panel doors therefor.

With both indoor and outdoor switchgear equipment, each unit of which is customarily enclosed in one of a plurality of individual steel cubicles which, when grouped together, form a multiple assembly, it is necessary to provide door panels for each unit to make the switching mechanisms separately accessible for replacement, adjustment and repair. When closed, the door panels, which are normally hingedly supported from one cubicle side wall, enclose the energized portions of the switching mechanism for the protection of operating personnel and maintenance of optimum atmospheric surroundings.

In switchgear of the drawout type equipped with the conventional panel hinged at a fixed position at one of the cubicle walls, it is necessary to open the panel in order to withdraw the switch on its pantograph or other movable support means to its disconnected position. In this position the switch projects beyond the panel hinge and thus makes it impossible to reclose the panel. Also, when the switchgear is mounted in a weatherproof outer housing, the open panel projects from the cubicle outwardly through the plane of the weatherproof housing doors, thereby preventing such doors from being closed. This situation is highly undesirable as the switch mechanism is then exposed to the elements and the operating personnel is no longer adequately protected.

Attempted solutions of the instant problem have included the provision for a cubicle large enough to position the panel sufficiently far from the frontispiece of the switch as to permit withdrawal of the switch to the fullest extent without requiring the panel to be open. This solution is unsatisfactory as the normal operating position of the switch will be considerably spaced from the panel, the operation of manual control means situated on the switch then being difficult and unsafe unless linkage means are provided between the panel and the switch. Although linkage systems have been used commercially, their application involves complications in design and is otherwise unsatisfactory because the manual control mechanism positioned on the switch must always correspond with the panel mechanism, thereby preventing in some cases convenient interchange or replacement by switches of a manufacture other than the original. It is also difficult to view the "open" and "closed" indicators commonly employed in this equipment with the panel positioned at a distance from the normal operating position of the switch.

It is the principal object of this invention to overcome these difficulties and to provide a type of panel mounting which permits the panel to be closed in any selected switch position and to close the energized portions of the switchgear mechanism in all such selected switch positions. It is thus an object of this invention to provide panel support means by which the panel may be moved with the switch into its various selected positions to permit the panel to be opened or closed in any one of the selected positions and to make the manual operating means of the switch accessible in certain of these selected switch positions.

Another object of the invention is to provide such a panel support means as to permit the outer housing door to be closed for any position of the switchgear.

Another object of the invention is to provide panel support means which, when desired, will permit manual operation of the switch only at certain selected switch positions, and to prevent manual operation of the switch at closed positions of the panel in other selected switch positions.

These results are preferably accomplished by means of a double hinged support for the panel which cooperates with the drawout switch by virtue of a simple and inexpensive structure which may be adapted for use with any type of manufacture of switchgear and which may be made integral with the cubicle housing as a standard item of manufacture.

Objects and advantages other than those above set forth will be apparent from the following description when read in connection with the accompanying drawing, in which.

Figure 1:
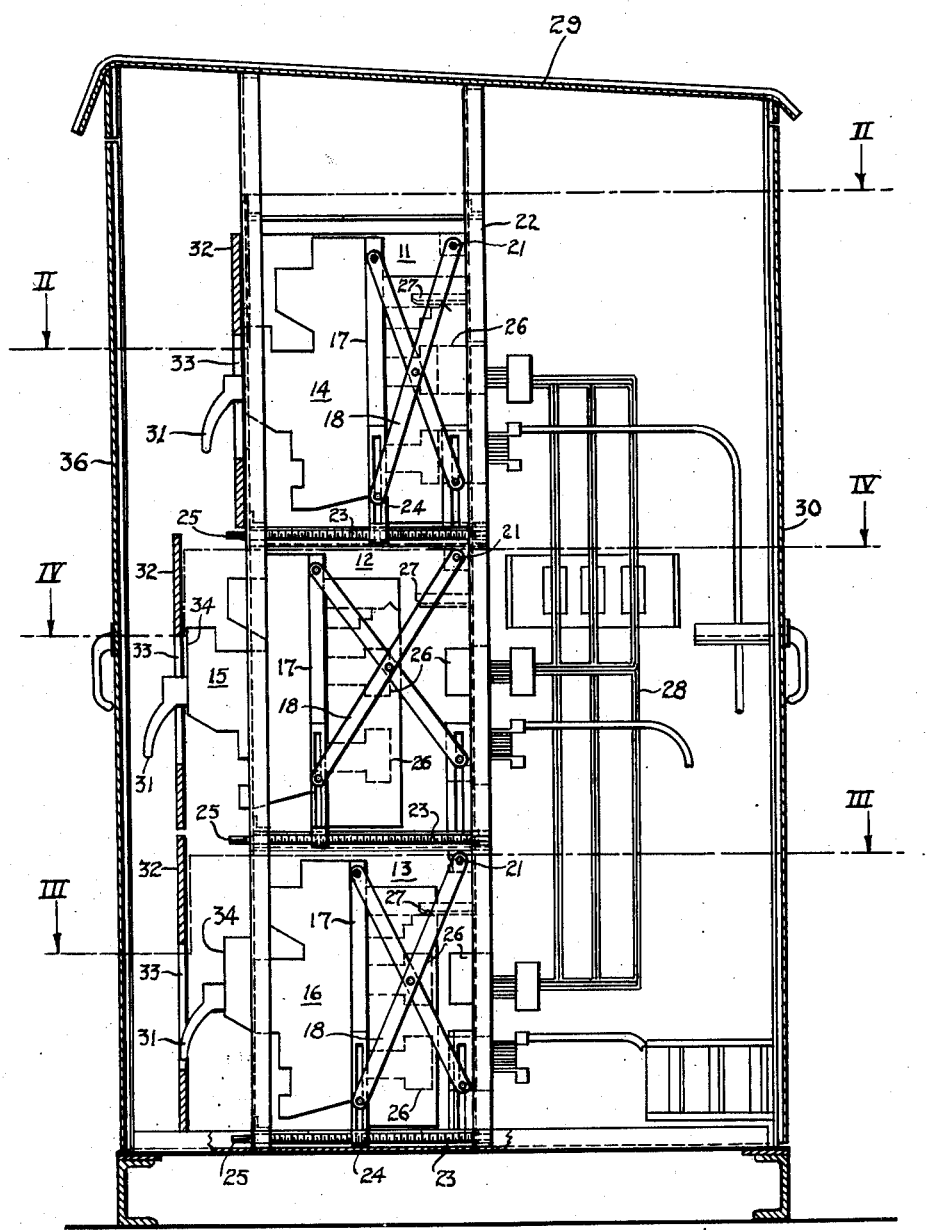
Fig. 1 is a side elevational view of a vertical bay of multiple cubicle drawout switchgear equipment mounted in a weatherproof housing with portions cut away or shown in section to show structural features.

Referring more particularly to the drawing by characters of reference, Fig. 1 shows diagrammatically the conventional arrangement of low voltage metal enclosed switchgear wherein cubicles 11, 12 and 13 constitute a vertical bay of individual enclosing chambers in which are separately housed current interrupters or switches generally designated 14, 15 and 16. The switches 14, 15 and 16 are movably supported in cubicles 11, 12, 13 by any suitable known means, such as pairs of conventional pantographs 18. The pantographs are pivotally attached at 21 to the upright members 22 of the switchgear support framework. Each individual switch may be withdrawn bodily from its normal operating position, shown at 14, to its intermediate or test position, shown at 16, and finally to its disconnected position, shown at 15, by suitable known drawout means such as a screw 23 threaded through depending portion 24 of the frame 17 which supports the switch.

Screw 23 may be rotated by means of a crank, fitted for detachable connection to a squared portion 25 of the screw 23 accessible from the front of the individual cubicles 11, 12 and 13 whereby each separate switch unit may be bodily shifted on its pantograph into or out of selective engagement with the primary contacts 26 and the auxiliary contacts 27 which are mounted and aligned at the rear of the switch and cubicle for sliding frictional contact. The busses shown in general at 28 complete the circuits to the operating equipment.

Each of the cubicles is provided with a front shielding panel 32 which serves to complete the enclosure formed by the cubicle side walls. The construction and function of the panel 32 will be later herein described.

The entire switchgear may be further enclosed by an outer weatherproof housing 29 which is provided with front doors 36 and rear doors 30 to permit access to each bay of cubicles and their associated busses. Although a bay consisting of three cubicles is shown, it is to be understood that the invention is equally applicable to any greater or lesser number of cubicles arranged multiply or individually.

Figure 5:
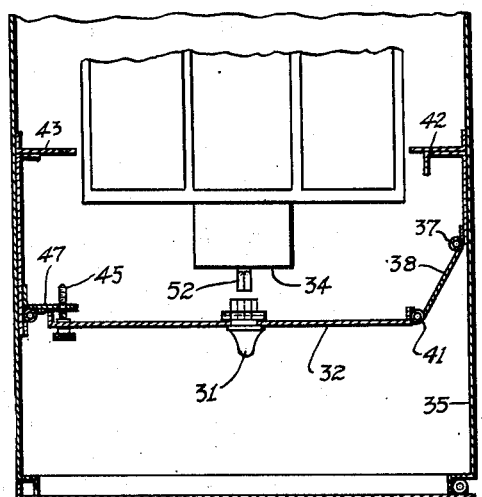
Fig. 5 is a view similar to Fig. 4 of a modification of the invention wherein the switch control handle is mounted on the door panel and is connected to the switch operating mechanism only when the switch is in normal operating position.

The operating mechanism of the switches 14, 15 and 16 may be actuated in several different ways. Manual operation is effected through a handle 31 which may be either mounted directly on the frontispiece 34 of the switch, as best shown in cubicle 13 in Fig. 1, thus projecting through aperture 33 in the door panel, or on the door panel 32 which encloses each individual switch, as best shown in Fig. 5. In the latter case the mechanism is provided with a shaft 52 for operative connection with the handle 31 when the panel 32 is closed in certain selected switch positions. The switch may also be actuated remotely as by a solenoid, or the like, made integral with the switch and electrically connected to the remote control equipment through some of the auxiliary contacts 27 mounted at the rear of the switch.

The withdrawal of the switch into its test position, shown at 16, will disengage the primary contacts 26 while leaving the auxiliary contacts 27 still engaged, whereby the remotely controlled operation of the switch may be tested without having any effect upon the disengaged power circuit. The withdrawal of the switch into its disconnected position, as shown at 15, will disengage the auxiliary contacts 27 as well as the primary contacts 26, thus rendering the switch completely isolated electrically from the busses, shown generally at 28, and permitting the removal for exchange or repair of the switch. When the switch is in normal operating position, as shown at 14, both the primary contacts 26 and secondary contacts 27 are engaged for normal operation of the switch.

In the embodiment shown in Figs. 1 to 4, the closed shielding door panel 32 via aperture 33 complements the frontispiece 34 of the switch in enclosing completely the energized portions of the switchgear both for the purpose of protecting operating personnel from accidental flashovers and the like, and in maintaining optimum atmospheric surroundings for the proper mechanical and electrical operation of the switching equipment. In the modification shown in Fig. 5 the panel alone performs the described shielding functions.

Heretofore, with a panel supported on the side wall of each individual cubicle by a single fixed position hinge, it was necessary to swing the panel into an open position in order to withdraw the switch to either its test or disconnected position. The panel could not then be reclosed because of physical interference with the withdrawn switch structure. With the door thus opened and projecting through the plane of the weatherproof outer housing door, it was impossible to close the outer housing door while any of the individual switches were in a withdrawn position. This situation was undesirable in that the switch mechanism was thus exposed to the elements and the operating personnel was no longer protected.

The present invention overcomes these undesirable features by providing that the panel 32 remain in switch enclosing relationship in several of the various selected positions of the switch, either operating or withdrawn. In conformance with the present invention, the panel 32 is mounted in such a manner that it may be made to travel in accordance with the movements of the switch into various selected switch positions and thus maintain approximately a switch enclosing relationship in such selected positions.

Figure 2:
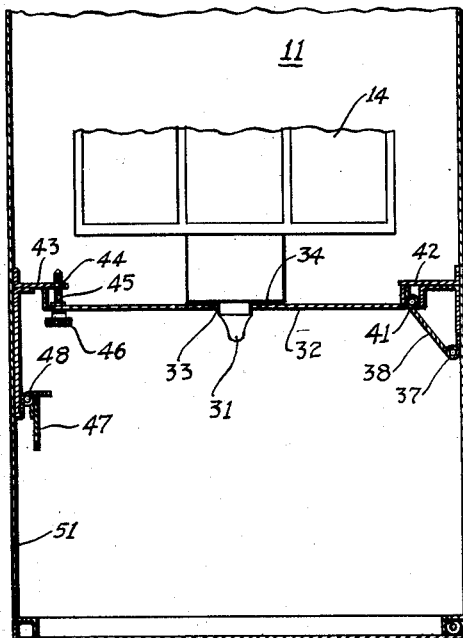
Fig. 2 is a stepped cross sectional view taken along line II—II in Fig. 1, illustrating only one switch shown diagrammatically in normal operating position.

For this purpose the panel 32 is supported by a double hinge arrangement which consists of a fixed position hinge 37 attached to side wall 35, a movable hinge 41 parallel to hinge 37 and fixed along an edge of panel 32, and a leaf 38 joining the two hinges. Leaf 38 may be fastened to one of the straps of each of hinges 37, 41 or may constitute the hinge straps to form piano hinges. With the switch in normal operating position, as indicated in Fig. 2, panel 32 seats against sills 42 and 43. Sill 43 is tapped at 44 for threaded connection with bolt 45 which is positioned near the free edge of panel 32 and provided with a knurled outer portion 46 for detachably securing panel 32 to sill 43. A stable positioning of the panel is insured by the additional contact of hinge 41 against sill 42.

Figure 3:
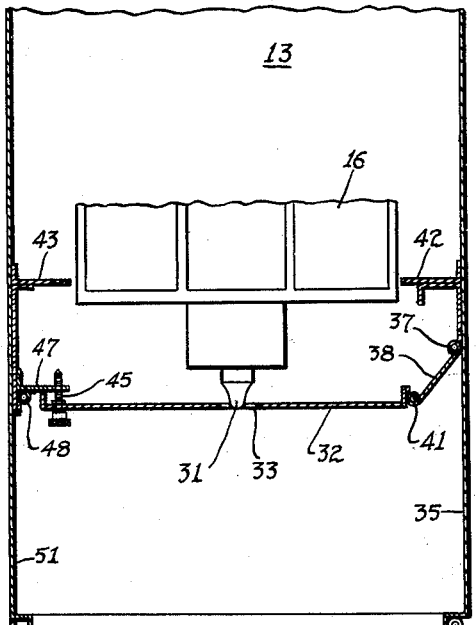
Fig. 3 is a stepped cross sectional view taken along line III—III in Fig. 1, illustrating only one switch shown diagrammatically in test position.
Figure 4:
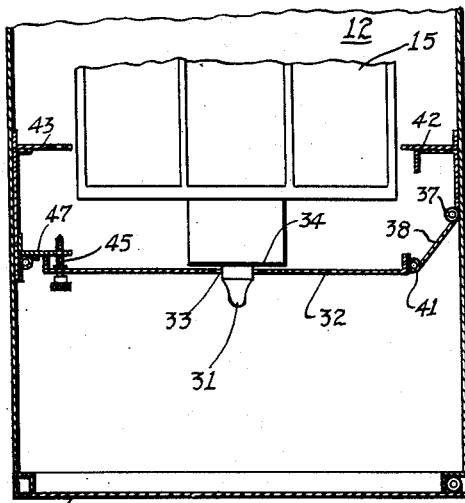
Fig. 4 is a stepped cross sectional view taken along line IV—IV in Fig. 1, illustrating only one switch shown diagrammatically in disconnected position.

In order to maintain such switch enclosing relationship when it is desired to withdraw the switch to either test or disconnected position, the panel may be withdrawn from its rear position shown in Fig. 2 to its forward position shown in Figs. 3 and 4 by swingably shifting the panel 32 on its movable hinge 41 and its fixed hinge 37. In this position the panel may be seated against an auxiliary butt plate 47 into which the knurled bolt 45 is detachably secured. When the panel is in its rear position, as shown in Fig. 2, butt plate 47 may be swung on its supporting pivot hinge 48 against side wall 51 to facilitate movement of the panel 32 through its various positions.

When the switch 14 is of the type equipped with a manual operating handle integral with the frontispiece 34 of the switch, panel door 32 is provided with an aperture 33 through which the handle projects, thus permitting manual operation of the switch with the panel closed. In those switches where the manual operating mechanism is actuated by a handle mounted on the panel 32, as shown in Fig. 5, such handle operatively engages with the shaft 52 mounted on the frontispiece 34 of the switch when the panel is closed in the normal operating position (not shown).

When it is desirable that the switch be incapable of manual operation when in any position other than the normal operating position, the distance between the rear and forward positions of panel 32 may be made greater than the distance traveled by the switch in its withdrawal operation. If handle 31 is mounted on the panel, and the switch is in disconnected position, such handle will not operably engage shaft 52 which is mounted on the frontispiece 34 of the switch but will be separated therefrom as shown in Fig. 5.

It may in some cases be desired that the manual operating means be operable in both the normal operating position and the disconnected position of the switch. In such case the distance between the rear and forward positions of the panel 32 may be made to correspond with the distance traveled by the switch itself so as to maintain approximate registration of the switch control elements and panel in both the normal operating and disconnected positions.

When the manual operating mechanism is of the type wherein the handle 31 is rotatably mounted on the frontispiece 34 and projects through the aperture 33 provided therefore in panel 32, and the switch is in test position, such handle may not be capable of rotation because of the interference with the edges of such aperture, as shown in Figs. 1 and 3 (at cubicle 13). If desired, however, the aperture may be made sufficiently wide to permit rotation of the handle without interference with the operation edge with the switch in test or other withdrawn position.

The type of operation desired will determine the initial construction of the double hinged panel and will necessitate an initial determination of distance between sill 43 and butt plate 47 and also sill 42, fixed hinge 37 and the length of the leaf 38.

From the foregoing description taken in connection with the drawings, it is seen that the switch may be placed in any of its three positions and that the panel 32 may be closed in any one of the three positions with the manual operating means operative in certain of such positions depending upon the selection of the dimensions of the panel support elements. Thus there is no necessity for keeping the panel 32 open or swung out into the plane of the outer housing doors 36 except when actually removing the switch or otherwise making adjustment of elements to the rear of the panel. Use of the invention permits the outer weatherproof housing doors 36 to be reclosed even when one or more of the switches is withdrawn to the test or disconnected positions. Likewise operating personnel is at all times fully protected by virtue of the panel being closed during shifting operation of the switches.

A typical mode of operation when desiring to withdraw a switch from its normal operating to disconnected position would be first to swing the double hinged panel 32 into its forward position, securing it in closed position to the butt plate 47, and then manually cranking the switch by means of the screw 23 and associated elements into its disconnected position. During this operation the operator is protected by the closed panel from any accidental flashovers or any other danger emanating from the energized portions of the switchgear. It is expected that the equipment be provided with the usual interlock arrangements, not shown, which insure that the switch be tripped before withdrawal.

It is evident that the described invention provides a simple solution of the problem of enclosing drawout type switchgear for all positions of the switch. In addition it provides an inexpensive and practical means without resorting to complicated linkages or other devices necessary when a single hinged panel is utilized.

Various changes or modifications may be made in the embodiments illustrated without departing from the spirit of the invention or from the scope of the appended claims.

It is claimed and desired to secure by Letters Patent:

1. In drawout type switchgear, the combination comprising: a cubicle, a switch, means movably mounted within said cubicle for supporting said switch, means for actuating said supporting means to bodily shift said switch from an energized position into a deenergized position, a shielding panel supported in a first position for enclosing the energized portions of said switch in switch energized position, and means for moving said panel from said first position into another switch enclosing position before movement of said switch into its deenergized position.

2. In drawout type switchgear, the combination comprising: a cubicle, a switch, means movably mounted within said cubicle for supporting said switch, means for actuating said supporting means to bodily shift said switch from an energized position into a deenergized position, a shielding panel supported in a first position for enclosing the energized portions of said switch in switch energized position and preventing movement of said switch into deenergized position, and means for moving said panel from said first position into another switch enclosing position, thereby releasing said switch from energized position and providing for unrestricted movement of said switch into said deenergized position.

3. In drawout type switchgear, the combination comprising: a cubicle, a switch, means movably mounted within said cubicle for supporting said switch, means for actuating said supporting means to bodily shift said switch from an energized position into a plurality of other positions, a panel supported in a first position for enclosing at least a part of said switch in said energized position and preventing movement of said switch out of said energized position, and means for moving said panel from said first position into another switch enclosing position to release said switch from said energized position and provide for unrestricted movement of said switch into any one of said other positions.

4. In drawout type switchgear, the combination comprising: a cubicle having a wall, a switch, means movably mounted within said cubicle for supporting said switch, means for actuating said supporting means to bodily shift said switch from an energized position into a plurality of other positions, a swingable shielding panel supported in a first position for enclosing at least a part of said switch in said energized position, and means for moving said panel from said first position into a second switch enclosing position to release said switch from its energized position and provide for unrestricted movement of said supporting means to move said switch into one of said other positions, said means for moving said panel comprising a fixed position hinge attached to said cubicle wall and a movable hinge attached to said panel and connected to and rotatable about the axis of said fixed position hinge.

5. In drawout type switchgear, the combination comprising: a cubicle having a wall, a switch, means movably mounted within said cubicle for supporting said switch, means for actuating said supporting means to bodily shift said switch from an energized position into a plurality of other positions, a swingable shielding panel supported in a first position for enclosing at least a part of said switch in said energized position, and means for moving said panel into a second switch enclosing position to release said switch from its energized position and provide for unrestricted movement of said supporting means to move said switch into one of said other positions, said means for moving said panel comprising a fixed position hinge attached to said cubicle wall and a movable hinge attached to said panel and connected to and rotatable about the axis of said fixed position hinge, said panel when moved into said second position enclosing said part of said switch during movement of said switch from said energized position into any one of said other positions.

6. In drawout type switchgear, the combination comprising: a cubicle, a switch, means movably mounted within said cubicle for supporting said switch, means for actuating said supporting means to bodily shift said switch from an energized position into another position, manual control means for actuating said switch, a shielding panel supported in a first position for enclosing the energized portions of said switch, said panel having an aperture in the panel face through which said manual control means projects when said switch is in energized position, and means for moving said panel from said first position into another switch enclosing position before movement of said switch into its other position, said manual switch control means being positioned within said aperture when said switch is in said other position to prevent actuation of said manual switch control means.

7. In drawout type switchgear, the combination comprising: a cubicle, a switch, means movably mounted within said cubicle for supporting said switch, means for actuating said supporting means to bodily shift said switch through a plurality of positions, a swingable shielding panel supported in a first position for enclosing at least a part of said switch, means for locking said panel in said first position, means for moving said panel into a second switch enclosing position, said panel moving means comprising a fixed position hinge attached to said cubicle and a movable hinge attached to said panel and connected to and rotatable about the axis of said fixed position hinge, and means for locking said panel in said second position comprising a butt plate positioned on said cubicle for detachable seating connection with said panel when in locking position and hinged for holding against said cubicle when in unlocking position.

8. In drawout type switchgear, the combination comprising: a cubicle, a switch, means movably mounted within said cubicle for supporting said switch, means for actuating said supporting means to bodily shift said switch from an energized position to a predetermined deenergized position, a shielding panel supported in a first position for enclosing the energized portions of said switch in said energized position and lock said swtich in said energized position, manual control means for actuating said switch comprising a detachable handle mounted on said panel for actuating said manual control means, and means for moving said panel from said first position into a second switch enclosing position to thereby release said switch from said energized position, provide unrestricted movement of said switch into said deenergized position, detach and isolate said handle from said manual control means and maintain said handle detached and isolated from said manual control means when said switch is moved from said energized position into said deenergized position.

BORIS VOLGOVSKOY.

REFERENCES CITED

The following references are of record in the file of this patent:

UNITED STATES PATENTS

| Number | Name | Date |
|---|---|---|
| 931,362 | Wheeler et al. | Aug. 17, 1909 |
| 1,500,211 | Starrett | July 8, 1924 |
| 1,768,535 | Ainsworth | July 1, 1930 |
| 2,125,747 | Zadek | Aug. 2, 1938 |
| 2,175,949 | Allen | Oct. 10, 1939 |
| 2,480,568 | Garvin | Aug. 30, 1949 |